United States Patent [19]

Iuchi

[11] Patent Number: 4,688,616
[45] Date of Patent: Aug. 25, 1987

[54] PNEUMATIC RADIAL TIRES FOR HEAVY VEHICLES

[75] Inventor: Munenori Iuchi, Shirakawa, Japan

[73] Assignee: Sumitomo Rubber Industries Ltd., Japan

[21] Appl. No.: 775,004

[22] Filed: Sep. 11, 1985

[51] Int. Cl.$^4$ .............................................. B60C 15/06
[52] U.S. Cl. .................................. 152/541; 152/543; 152/546; 152/547
[58] Field of Search ............... 152/540, 543, 546, 548, 152/553, 554, 542, 541, 547

[56] References Cited

U.S. PATENT DOCUMENTS

| | | | |
|---|---|---|---|
| 3,557,860 | 1/1971 | Maiocchi | 152/543 X |
| 3,921,693 | 11/1975 | Suzuki et al. | 152/543 X |
| 3,964,533 | 6/1976 | Arimura et al. | 152/543 X |
| 4,289,184 | 9/1981 | Motomura et al. | 152/543 X |
| 4,319,622 | 3/1982 | Iuchi et al. | 152/540 |
| 4,342,353 | 8/1982 | Tamura et al. | 152/546 X |
| 4,352,383 | 10/1982 | Matsumoto et al. | 152/554 X |

FOREIGN PATENT DOCUMENTS

| | | | |
|---|---|---|---|
| 56-25006 | 10/1981 | Japan | |
| 59-84608 | 5/1984 | Japan | 152/543 |
| 59-89206 | 5/1984 | Japan | 152/546 |
| 0995645 | 6/1965 | United Kingdom | 152/543 |

Primary Examiner—Donald E. Czaja
Assistant Examiner—Ramon R. Hoch
Attorney, Agent, or Firm—Stevens, Davis, Miller & Mosher

[57] ABSTRACT

A reinforced radial tire bead construction for heavy load vehicles, such as trucks and buses, which has well-balanced rigidity and excellent durability and recapability. The tire has a carcass ply turned up around a pair of bead cores and a first reinforcing layer composed of rubber-coated steel cords, and a second reinforcing layer composed of rubber-coated organic fiber cords and a relatively soft apex strip. The first reinforcing layer surrounds the turned-up portion of the carcass ply and the second reinforcing layer of organic fiber cords is radially outside the first reinforcing layer, and is substantially continuously extended from a height covering both the radially outermost ends of the first reinforcing layer and the turned-up portion of the carcass ply to the inner surface of carcass ply main portion through the bead base.

2 Claims, 4 Drawing Figures

PNEUMATIC RADIAL TIRES FOR HEAVY VEHICLES

BACKGROUND OF THE INVENTION

1. Field of the Invention

The present invention relates to an improvement for reinforcing bead sections of radial tires provided with carcass ply composed of steel cords, radial tires for heavy-duty vehicles, such as trucks and buses, etc.

2. Description of the Prior Art

In heavy-duty vehicles there has recently been used radial tires, each having a rigid reinforcement in its tread portion, particularly a belt reinforcement composed of metal cords, such as steel cords or the like.

In general, radial ply tires using metal cords as a belt reinforcement have several advantages, such as wear resistance, puncture resistance and the like, as compared with the usual bias ply tires. This is because a stiff belt is disposed between the tread rubber and the carcass ply, but there is a disadvantage due to the rigid reinforcing effect of the belt.

The development of such radial tires are particularly advanced for use on good, smooth roads, as distinguished from rough or bad roads. Lately, the demand for these tires has increased because of the remarkable improvement of roads, even in more remote locations.

In general, a tire of this type comprises, as shown in FIG. 1, a carcass 2 of a single ply arranged in a substantially radial direction of the tire, or semi-radially of the tire, wherein the carcass ply forms small angle of about 10°-20° and at the largest an angle of less than 30°, with respect to the mid-circumferential plane of the tire, and is provided with a hard rubber apex strip with JIS hardness greater than 80°, and a relatively soft buffer strip 12 with JIS hardness of about 50°-60° disposed radially and axially outwardly from bead core 3 between the carcass main portion 2 and the main turnup portion 2' of the carcass ply 2.

The rubber strips 11 and 12 form a substantially triangular section, with a chafer strip 4 positioned outside the turnup portion 2' of the carcass ply 2. The chafer strip is composed of the rubberized metallic cords, each being crossed at an angle of 30°-60° range with respect to the radial direction of the tire. The aforementioned metallic cord chafer strip is provided for the exclusive purpose of alleviating stress concentration on the cord ends 2a of the turnup portion 2' of the carcass ply 2, and accordingly the radial outer end 4a of chafer strip 4 extends radially outwardly farther than the upper end 2a of the turnup portion 2'.

The axial and radial inward end of the chafer 4 is locked and turned substantially around the bead core 13, extending between the bead core and the bead seating portion.

In the aforementioned bead structure, however, the end 4a of the chafer 4, which is radially outwardly from the turnup portion 2', results in a new concentration of stress when under load, and the consequent repeated flexing of the tire sidewalls combined with the stresses imposed thereon results in early deterioration of the lower sidewalls, such as separation and rupture of the carcass ply and the chafer strip in the lower sidewalls and the bead portion.

To eliminate the above disadvantages, it has been proposed to stiffen the bead sections, and to this end the beads are built up in such a way as to include, in addition to the metallic bead core and the carcass ply wound around it, reinforcements of various kinds, for example, as disclosed in Japanese Pat. No. 976452.

A typical construction of this patent is shown in FIG. 2 hereof, having a chafer 4 composed of metallic cords disposed radially outside the turnup portion 2' of the carcass ply 2 and reinforcing layers 6 composed of rubberized organic fiber cords, wherein two or more layers are crossed with each other, and arranged outside of chafer strip 4 and extend radially outwardly from the bead base to the region at which the width of the tire cross-section is at a maximum when the tire is inflated. The upward cut ends of the turnup portion of the carcass ply and of the metallic cord chafer are completely covered with organic fiber cord reinforcing layers 6, and strips 11, 12 are disposed between the carcass ply main portion 2. The turnup portion 2' with the chafer 4 and the rubberized organic fiber cord reinforcing layers 6 extend radially and axially outwardly from the bead core 3 beyond outermost cord ends of the turnup portion and of the metallic cord chafer in radial direction, and gradually decrease in thickness towards the sidewall of the tire to form a substantially triangular section, which consists of an apex strip 11 of a hard rubber stock with JIS hardness more than 80° and a buffer strip 12 of a relatively soft rubber stock with JIS hardness of 50°-60°. This assembly is along the side of the turnup portion 2' of carcass ply 2 and extends along the organic fiber cord reinforcing layers 6 outwardly in the radial direction of the tire to protect the outermost cords ends 2a, 4a of the turnup portion and the metallic cord chafer, respectively, from stress concentration of them by the consequent repeated flexing of the tire sidewalls.

Another prior art attempt is in U.S. Pat. No. 3,557,860, which discloses a pneumatic radial tire in which the beads comprise at least a pair of bead core of steel wires about which the carcass plies are turned up, said carcass plies being all turned up axially outwardly towards the rim flange, and including a triangular filler made of a high rigidity rubber layer or the like above the bead core, and reinforcing elements constituted by two groups of strips of cord fabric, each group having one or more strips, the first group being placed inwardly of the bead between the carcass plies and the triangular filler, and the second group being placed outwardly of the bead and of the carcass plies and alongside the turned-up portion of said plies, said groups of strips extending radially from a point approximately at the height of the inner periphery of the bead ring to at least one-sixth of the height of the tire section. Tires constructed as above-described have been favorably accepted by drivers as a tire which may be used under severe and heavy load conditions.

Recently, some drivers have begin to use such tires under even more severe service conditions, such as running at high speed for a long period of time under heavy loads. In addition, in order to substantially reduce the cost of tires, the frequency of using a steel core radial tire for recapping has increased. It has become common to desire to recap a worn tire two or three times. Under such circumstances, the above-described structures are usually insufficient as to durability of the bead portion, which is vital to preserve a worn tire for recapping.

Radial and semi-radial tires usually have a carcass of a single ply composed of radially directed cords. As a result, the sidewall of a radial tire is extremely soft, and hence its flexure in the direction of the axis of rotation of the tire is very large. Thus, the amount of deformation of the tire during one rotation is larger than that of the bias tires. That is, the bead section of the said tire is strongly forced to deform over the rim flange in a convex configuration under the influence of such soft sidewalls, and it was found by the inventor that the internal temperature of the bead section increases up to over 120° C. by the transmission of heat from the brake drum of vehicles.

Thus, the bead sections suffer from dynamic fatigue and thermal fatigue. Unfortunately, the adhesion of the rubber with the metallic cords or fabric cords, which is vital to the maintenance of tire performance, is closely related to this dynamic and thermal fatigue.

When the internal temperature of the tire rises above a certain level, the tire will be suddenly broken down by the lowering of the adhesion among these components.

Accordingly, it is necessary and essential for advancement of tire durability to establish techniques which can control the internal termperature of a tire at a low level and which can maintain the adhesion at a high level, which do not so depend upon the internal temperature thereof.

As part of the effort to overcome these prior art problems, the present application has proposed, for example, an excellent reinforced construction of a bead section in Japanese Pat. No. 967452 (Patent Publication No. 11481 of 1977), which is disclosed in FIG. 2 hereof.

As above-mentioned, a tire construction as above-described has been favorably accepted by drivers as a tire which can be used under severe and heavy load conditions.

As above-mentioned, a principal object of the present invention is to control the internal temperature increase and the partial movement of the bead section by way of removing the gap of elasticity in the radial direction, the circumferential direction and the lateral direction from the upper sidewall to the bead portion by arranging on the outer side of the tire, in axial direction thereof, at least one fiber cord reinforcing layer composed of the rubber coated organic fiber cords, like nylon and polyester, having medium elasticity between rubber compounds and steel cords, in order to mitigate stress concentrations and deflection in the cords ends 4a of the steel cord reinforcing layer and the cords ends 2a of the turnup portion 2' of the carcass ply 2.

When one reinforces the bead portion by fiber cords, as above-mentioned, the durability of tires is certainly increased, but the service conditions of tires have become increasingly severe, and since there are types of radial tires which are repeatedly used for recapping the tire treads several times, this recapability is regarded as a sales point for steel radial tires. This recapability depends on the durability of the bead section, and the above-described known tires do not always satisfy this requirement.

On the other hand, these tires have been used under heavy loads and severe conditions and frequently used under the more severe service conditions to save fleet expenses. Therefore, more improvement of the durability of the bead sections is required.

We turn now to a consideration of strain behavior in the bead section when the above-discussed tire is inflated. As shown in FIG. 3, a carcass ply main portion 2 turned up around a bead core 3 moves upwardly, as shown by an arrow 21, and the end 2a of the turnup portion moves downwardly in the radial direction, as shown by arrow 22, thus tending to disengage the carcass ply from the bead core 3, the turnup portion 2' of the carcass ply 2 causes steel cord chafer strip 4 and the organic fiber cord reinforcing layers 6 to move downwardly, as shown by an arrow 23.

The bead core 13 likewise tends to turn, as shown by arrow 24, in addition, the deformation of the tire when it is inflated causes a shearing strain to be produced among those components.

When the adhesion among these layers is unable to endure this strain, the carcass ply 2 is pulled out of the bead core 3, this phenomenon will hereinafter be called "blow out" for the sake of convenience.

This "blow out" phenomenon is apt to occur owing to the said internal temperature, and the higher the temperature, the earlier it occurs.

The inventors have made various investigations with respect to the aforementioned internal temperature and strain in the bead section in order to provide a tire having an improved durability in its bead reinforcing structure and found the following facts in relation to such prior art, that is, having at least two reinforcing organic fiber cord layers and a steel cord reinforcing layer arranged axially outside of the turnup portion of the carcass ply, as proposed in Japanese Pat. No. 967452.

To begin with, the high inner pressure and the high load on the tire are loaded by the carcass ply main portion and the cord paths (the space between the adjacent steel cords) are expanded by the said load at the upper side of the bead portion, then the sidewall portions over the rim flange are forced to deflect largely towards the outer side of the axial direction of the tire and to be convexly shaped, as a result, the bead portions connected with the sidewall are obliged to undergo a large flexure, thus, as previously stated, the "blow out" phenomenon of the carcass ply cords is accelerated.

Therefore, to control the expansion of the cord path is the most important role in a matter of controlling the flexture in the bead portions, thus the second reinforcing layer composed of at least two organic fiber cord reinforcing plies is arranged in the inner side of the carcass ply main portion in order to control the phenomenon of "expansion of cord paths", and an apex triangle composed of a single rubber stock having low modulus and low heat generating characteristics is disposed between the carcass ply main portion and the turnup portion of the carcass ply, in order to improve the resistance to the dynamic and thermal fatigue, by means of controlling the heat generation in the bead regions. As a result, there is provided a highly durable reinforced construction of the bead regions of large size radial tires for truck and other heavy vehicles which can be recapped two or three times without damaging the carcass and with a minimum of the "blow out" phenomenon of the carcass ply.

BRIEF SUMMARY OF THE INVENTION

It is an object of this invention to provide pneumatic radial tires for heavy vehicles in which can be controlled both the internal temperature increase and the partial movement of the bead section.

Another object of this invention is to provide pneumatic radial tires for heavy vehicles having increased durability.

A further object of this invention is to provide pneumatic radial tires for heavy vehicles which can be restrained from the aforementioned "blow out" phenomenon.

DETAILED DESCRIPTION OF A PREFERRED EMBODIMENT

Figure 1:
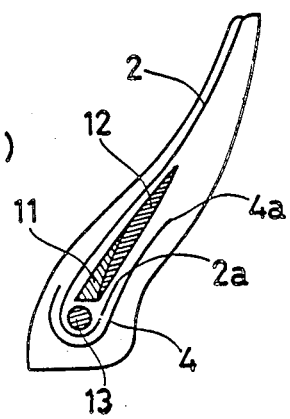
FIG. 1 is a cross-sectional view of a bead section of a prior art steel radial tire construction.

The present invention provides a pneumatic radial-type tire having improved durability in the bead regions, comprising at least one carcass ply composed of steel cords in a substantial radial arrangement or a semi-radial arrangement and turned up axially outwardly of the tire around a bead core 13, and a bead reinforcing structure inclusive of the first reinforcing lever 4 composed of rubberized steel cords and arranged along and adjacent to the outer side of the turnup portion 2' of the carcass ply 2. This tire further comprises a carcass reinforcing member 3 as the second reinforcing layer composed of at least two rubberized organic fiber cord plies secured to the axial inner side of the carcass ply main portion 2 and around the bead core overlapping the first reinforcing layer 4 at the vertical height $h_1$ of the upper end $2a$ of the turnup portions, of the carcass ply 2 from the bead base member arranged to be higher than the vertical height $h_2$ of the upper end $4a$ of the reinforcing layer 4, that is, there is always a relation of $h_1 > h_2$. The first reinforcing layer 4 extends from height $h_2$ along the turnup portion 2' of the carcass ply 2 and turns toward the inner side of the bead core, and is turned up and terminated at the height $h_2'$, which is lower than the height $h_1$ of the upper end of the turned-up portion of the carcass ply.

Furthermore, the second reinforcing layers 3, wherein two or more plies of rubberized organic fiber cords are crossed with each other, are arranged on the outside of the above-mentioned first reinforcing layer 4 beginning at a perpendicular height $h_3$ from the bead base for its radially outermost end, and is in the axial outer position of the tire and is within the range from 1.2 to 2.5 times as high as the height $h_1$ of the upper end of the turned-up portion of the carcass ply. The height $h_3'$ of the upper end $3b$ of the inward turned-up portion of the said second reinforcing layer 3, at the inside of the axial direction of the bead core, is within the range from 1.2 to 2.5 times the height $h_1$ of the upper end $2a$ of the turned-up portion of the carcass ply. An apex strip SE, composed of a soft single rubber stock of triangular cross-section, extends upwardly from the bead core in the radial direction of the tire and gradually decreases in thickness towards the radial direction, fills the space defined between the carcass ply main portion and its turned-up portion while surrounding the bead core. The 100% modulus of elasticity of the said soft rubber apex SE is selected to be within a range between 15 kg/cm$^2$ and 40 kg/cm$^2$. The above-mentioned second reinforcing layers 3 are composed of at least two layers, wherein each cords are crossed between each layers inclusive of each cords of the first reinforcing layer.

Figure 4:
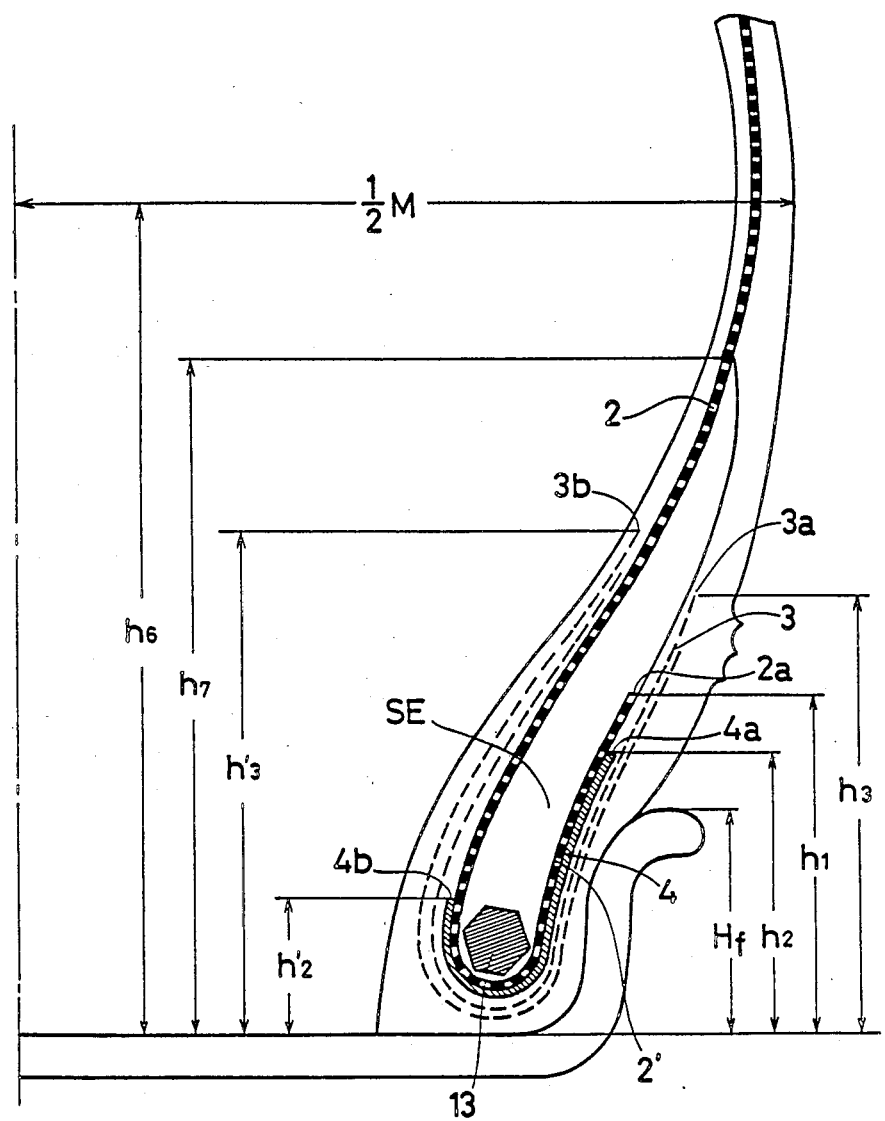
FIG. 4 shows a cross-sectional view of an embodiment of a pneumatic radial tire for heavy vehicles according to the invention.

In FIG. 4, the carcass ply 2 has cords arranged, at an angle in a range from 60°–90°, with respect to the mid-circumferential plane of the tire and as wrapped around a pair of bead cores 13 from the axial inside toward the axial outside thereof to form loops with turned-up portions in the radial direction of the tire. The perpendicular height $h_1$ from the bead base of its cut end $2a$ is preferably located in a range from 0.3 to 0.5 times as high as the height $h_6$ of the position at which the cross-section width of the tire is at a maximum when the tire is inflated to normal working pressure. Point $h_6$ is measured in the radial direction, perpendicular to the height from the bead base.

When $h_1$ is less than $0.3h_6$, the rigidity in the bead region is lower and the resistance to wear of the bead section due to the friction with the rim also lowers, so that there is a risk of the carcass ply 2 slipping out of the bead core 13 because the length of the turned-up portion is relatively short and its bonding area with the other components is insufficient.

On the contrary, when the height $h_1$ is more than $0.5h_6$, the radially outermost ends $2a$ of the turned-up portion is extended up to near the maximum width portion ($h_6$), at which the flexure is most severe, so the nucleus of a crack generates at those ends when the different of rigidity is large in the bead section under load and the radially outermost ends $2a$ is liable to be subjected to separation failure; accordingly, the height $h_1$ of the turned-up portion is preferred to be 0.3 to 0.5 times the height $h_6$.

The above-mentioned fact may also be confirmed by measuring of the resistance to the aforementioned "blow out" behavior and the strain of the cord end at the same time; it is preferable that the perpendicular height $h_2$ of the upper end $4a$ of the first reinforcing layer 4, composed of steel cord from the bead base, is 0.5 to 0.9 times as the height $h_1$ of the outermost end $2a$ of the turned-up portion of the carcass ply.

Figure 2:
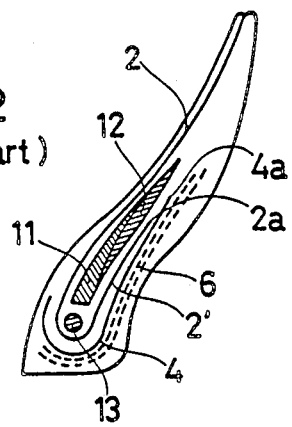
FIG. 2 is a cross-sectional view of another prior art reinforced bead section of a steel radial tire.
Figure 3:
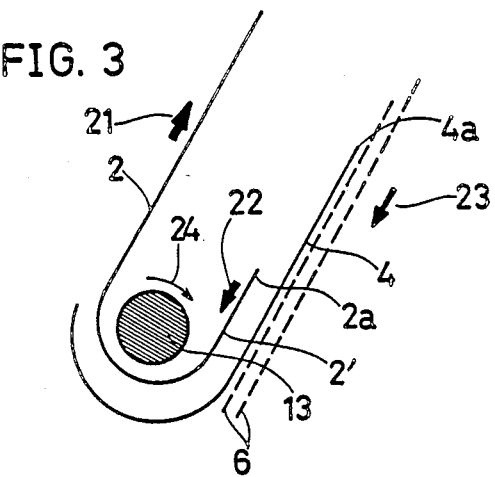
FIG. 3 is a schematic view illustrating a dislocating direction of reinforcing components in the bead section when a radial tire as shown in FIG. 2 is inflated.

The height $h_2$ of the outermost end $4a$ in the radial direction of the first reinforcing layer 4, composed of the outermost steel cords in the bead structure of the conventional prior art tires, as shown in FIG. 2, is higher than the height $h_1$ of the upper end $2a$ of the turned-up portion 2' of the carcass ply 2. In the prior art tires, bead failures have frequently occurred at the position where the upper end $4a$ of the first reinforcing layer 4 is located. The inventor studied the cause of the bead failure at this position and confirmed by many experiments that the upper end $4a$ of the first reinforcing layer 4 is likely to function as the resistant layer, having a high bending rigidity to the transmission of deflection from the sidewall region to the bead region, in which said deflection is repeated during every revolution of tire under load. As a result, the rubber at the cut end of each steel cords is broken down and caused to separate from the cords.

Furthermore, the higher the position of the upper end $4a$ of the first reinforcing layer 4, the earlier the separation between the cord end and the rubber occurs. Thus, it is important to locate the height of the upper end $4a$ of the first reinforcing layer 4, which offers strong resistance to the deflection of tire at as low a position as possible. As a result of the various examinations, it was found that the desirable height $h_2$ of the upper end of the first reinforcing layer 4 is in the range of 0.5 to 0.9 times as high as the height $h_1$ of the upper end $2a$ of the turned-up portion 2' of the carcass ply 2. When the height $h_2$ is less than $0.5h_1$, the rigidity of the bead section becomes too low, resulting in lowering of the resistance to wear of the bead section due to the fraction with the rim, and casing failure under severe load also becomes lower. On the contrary, when the height $h_2$ is in the range of 0.9 to 1.0 times as high as the height $h_1$, both upper ends of the turned-up portions $2'$ of the carcass ply 2 and the first reinforcing layer are overlapped with each other and, as a result, the stress concentration is doubled thereon; thus, bead failure tends to be induced earlier. Therefore, the range of the height $h_2$ of the upper end 4a of the first reinforcing layer 4 is preferred to be about 0.5 to 0.9 times as high as the height $h_1$ of the upper end 2a of the turned-up portion $2'$ of the carcass ply 2.

Furthermore, after elaborate experimental tests and investigations, the inventor recognized that the height $h_3$ of the second reinforcing layer 3, composed of organic fiber cord located at the axially outer side of the first reinforcing layer 4 and wound up around the bead base to the axially inner side of the bead portion and continuously extending upwardly along the carcass ply main portion, completely covering the upper end 4b of the first reinforcing layer from the bead base to the radial height $h_3'$, is preferred to be in a range to satisfy the following relation: $h_3=(1.2 \text{ to } 2.5)h_1$, $h_3'=(1.2 \text{ to } 2.5)h_1$. When the heights $h_3$ and $h_3'$ are less than $1.2h_1$, it cannot be expected that the gap in the rigidity at both upper ends of the turned-up portion of the carcass ply and the first reinforcing layer will be alleviated. To the contrary, if the heights $h_3$ and $h_3'$ are more than $2.5h_1$, the two upper ends 3a and 3b get near the severe flex zone of the sidewall and those upper ends 3a and 3b of the second reinforcing layer 3 then tend to induce crack failure. The cord angle of the second reinforcing layer is preferred to be crossed with each other at an angle from 30°–60° with respect to the carcass ply main portion at the height $h_1$ of the upper end of the turned-up portion of the carcass ply.

The bead apex rubber SE, as a whole, is triangular in cross-section and is disposed on the bead core between the carcass ply main portion 2 and the turned-up portion $2'$ of the carcass ply 2, the bead apex rubber is formed of one integral rubber piece having 100% modulus of elasticity of a range from 15 kg/cm$^2$ to 40 kg/cm$^2$, preferably within a range of between 20 kg/cm$^2$ and 35 kg/cm$^2$, from the viewpoint of enhancing the bead durability.

The inventors have found the fact that by reinforcing the axially outer side and the inner side of the bead region with the same organic fiber cord reinforcing layer, the expansion of cord path at the stress concentration and the stepped difference in rigidity at the ends of steel cords can be effectively mitigated, as a result, the "cord path" phenomenon and crack failure of the steel cord ends can be controlled and the durability of bead portions is greatly improved.

The effect of the invention will be described with reference to the comparison test of tires of 10.00 R20 14PR and 12R 22.5 14 PR, having a reinforcing bead structure based on the invention shown in Table 1 with a conventional tire having the same construction, except having a bead reinforcing structure as shown in Table 2, according to Japanese Pat. No. 52-11481, on tire size 10.00 R20 14 PR and 12R 22.5 14PR. In this test, the tires to be tested are run on a steel drum tester under constant work (load×speed) kg·km/h with the specific maximum inner pressure, during which the bead durability (running times until the bead portion is damaged by the "blow out" phenomenon) is measured to obtain a results as shown in Table 3, wherein the performance is expressed by an index on the basis that the conventional tire's performance is considered as 100 on the index.

TABLE 1

| (Present Invention) | | | |
|---|---|---|---|
| Structure | Tire Size | 10.00 R20 14PR (Tubed Tire (mm) | 12R 22.5 14PR (Tubeless Tire (mm) |
| Height $h_6$ at the maximum width | | 137 | 114 |
| Height of outermost end of turned-up portion of ply | $h_1$ | 68 | 40 |
| Height of the first reinforcing layer | $h_2$ | 57 | 30 |
| Height of the inner side of the first reinforcing layer | $h_2'$ | 53 | 24 |
| 100% modulus of coating layer | | 50 kg/cm$^2$ | 50 kg/cm$^2$ |
| JIS hardness | | 70° | 70° |
| Height of outermost end of the second reinforcing layer (outer side) | $h_3$ | 90 | 80 |
| Height of outermost end of the second reinforcing layer (inner side) | $h_3'$ | 110 | |
| 100% modulus of coating rubber | | 50 kg/cm$^2$ | 50 kg/cm$^2$ |
| Height of soft apex rubber | $h_7$ | 120 | 100 |
| 100% modulus | | 20 kg/cm$^2$ | 20 kg/cm$^2$ |
| JIS hardness | | 58° | 58° |

TABLE 2

| (Prior Art) | | | |
|---|---|---|---|
| Structure | Tire Size | 10.00 R20 14PR (Tubed Tire (mm) | 12R 22.5 14PR (Tubeless Tire (mm) |
| Height $h_6$ at a maximum width | | 137 | 114 |
| Height $h_1$ of outermost end of turn-up portion | | 45 | 30 |
| Height $h_2$ of steel cord reinforcing layer | | 57 | 40 |
| Height $h_2$ of inner side portion of steel cord reinforcing layer | | 53 | 22 |
| 100% modulus of coating rubber | | 50 kg/cm$^2$ | 50 kg/cm$^2$ |
| JIS hardness of coating rubber | | 70° | 70° |
| Height $h_3$ of fiber cord reinforcing layer | | 82 | 80 |
| 100% modulus of coating rubber | | 30 kg/cm$^2$ | 30 kg/cm$^2$ |
| JIS hardness of coating rubber | | 65° | 65° |
| JIS hardness of stiffener | | 85° | 85° |
| JIS hardness of buffer | | 60° | 60° |

TABLE 3

| Tires | Endurance 10.00 R20 | Index 12R 22.5 |
|---|---|---|
| Tires according to the invention | 198 | 215 |
| Conventional tire | 100 | 100 |

As apparent from the results of this Table, the tires according to the present invention can advantageously and effectively prevent the "blow out" phenomenon of the carcass ply turned-up portion and crack failure at the upper ends of the steel cord reinforcing layer and the turned-up portion of the carcass ply.

In addition, practical tests have demonstrated that the tire according to the invention can provide the excellent durability on new tires, and on recapped tires, so that less failure occurs even after many hours of intermittent or continuous use of the tire under severe conditions.

What is claimed is:

1. A pneumatic tire having a pair of bead cores, at least one carcass ply extending from bead core to bead core, a pair of sidewalls on said carcass, a tread portion thereon, a bead base and a reinforced bead construction, comprising:

said carcass ply being turned up around the bead cores from the axial inner side to the axial outer side, the turned up ends of the carcass ply extending radially outwardly to a perpendicular height $h_1$ above the bead base;

a first reinforcing layer of rubber-coated steel cords, disposed axially outwardly of the carcass ply turned-up portion, said first reinforcing layer having an axially outer end extending to a perpendicular height $h_2$ above the bead base and axially outside the carcass ply, said first reinforcing layer having an axially inner end turned up around the bead core and the carcass ply radially inwardly thereof to a perpendicular heigh $h'_2$;

a second reinforcing layer, having at least two plies of rubber-coated organic fiber cords, with cords which cross one another, and the ply of the second layer adjacent to the first reinforcing layer having cords which cross the cords of the first reinforcing layer, said second reinforcing layer extending around the bead core to overlap both ends of the first reinforcing layer, the second reinforcing layer extending to a perpendicular height $h_3$ on the axial outer side of the carcass ply and to a height $h'_3$ on the axial inner side of the carcass ply;

an apex strip triangular in cross-section, between the carcass ply and its turned-up end, extending radially outwardly from the bead core and circumferentially therearound; and said perpendicular height $h_1$, $h_2$, $h'_2$, $h_3$ and $h'_3$ satisfying the following equations:

$h_1 = (0.3$ to $0.5)h_6$; $h_2 = (0.5$ to $0.9)h_1$; $h'_2 < h_1$; $h_3 = (1.2$ to $2.5)h_1$; and $h'_3 = (1.2$ to $2.5)h_1$, where $h_6$ is a perpendicular height of the position at which the cross-section width of the tire is at a maximum when the tire is inflated to normal pressure.

2. The tire of claim 1 in which the apex strip is of rubber stock having a 100% modulus of elasticity of 15 to 40 kg/cm$^2$.

* * * * *